United States Patent [19]

Klejeski et al.

[11] Patent Number: 5,193,501
[45] Date of Patent: Mar. 16, 1993

[54] METHOD FOR ASSEMBLING AND PRELOADING SHAFT ASSEMBLIES IN RECIPROCATING INTERNAL COMBUSTION ENGINES

[75] Inventors: Anthony T. Klejeski, Bethel; Curtis D. Leaf, Blaine; James I. R. Butcher, Anoka, all of Minn.

[73] Assignee: Onan Corporation, Minneapolis, Minn.

[21] Appl. No.: 830,320

[22] Filed: Jan. 31, 1992

[51] Int. Cl.⁵ ............................................. B23P 17/00
[52] U.S. Cl. ................................ 123/197.4; 74/606 R; 74/595; 29/888.08
[58] Field of Search ............... 123/197.4, 197.1, 193.1; 74/606 R, 595; 29/888.08, 454; 384/584, 563

[56] References Cited

U.S. PATENT DOCUMENTS

| | | |
|---|---|---|
| 1,156,188 | 10/1915 | Sörensen . |
| 2,523,983 | 9/1950 | Arms . |
| 3,516,717 | 6/1970 | Peterson . |
| 3,905,661 | 9/1975 | Orr . |
| 4,301,776 | 11/1981 | Fleming ............................ 123/197.4 |
| 4,492,018 | 1/1985 | Rode ...................................... 29/454 |
| 4,611,935 | 9/1986 | Rode . |
| 4,690,112 | 9/1987 | Arnold .............................. 29/888.08 |
| 4,730,512 | 3/1988 | Ito et al. ................................ 74/595 |
| 4,887,560 | 12/1989 | Heniges ............................ 123/197.4 |
| 5,038,450 | 8/1991 | Swars .............................. 29/888.08 |
| 5,081,884 | 1/1992 | Cheng et al. ......................... 74/595 |
| 5,101,683 | 4/1992 | Pfennig ................................ 74/595 |

Primary Examiner—E. Rollins Cross
Assistant Examiner—M. Macy
Attorney, Agent, or Firm—Merchant, Gould, Smith, Edell, Welter & Schmidt

[57] ABSTRACT

A method for assembling and preloading shaft assemblies that are supported by bearings in reciprocating internal combustion engines and the resulting improved shaft assembly. The method is comprised of the steps of: placing a spring element (21) on one end of the shaft (10) wherein said spring element (21) is arranged and configured to fill any gap between the shaft (10) and the bearings (14, 15) that could arise from the accumulation of design tolerances in the shaft assembly components and arranged and configured to always exert a positive load on the shaft (10) to reduce the axial movement of the shaft (10); and securing the shaft (10) between the bearings (14, 15).

6 Claims, 2 Drawing Sheets

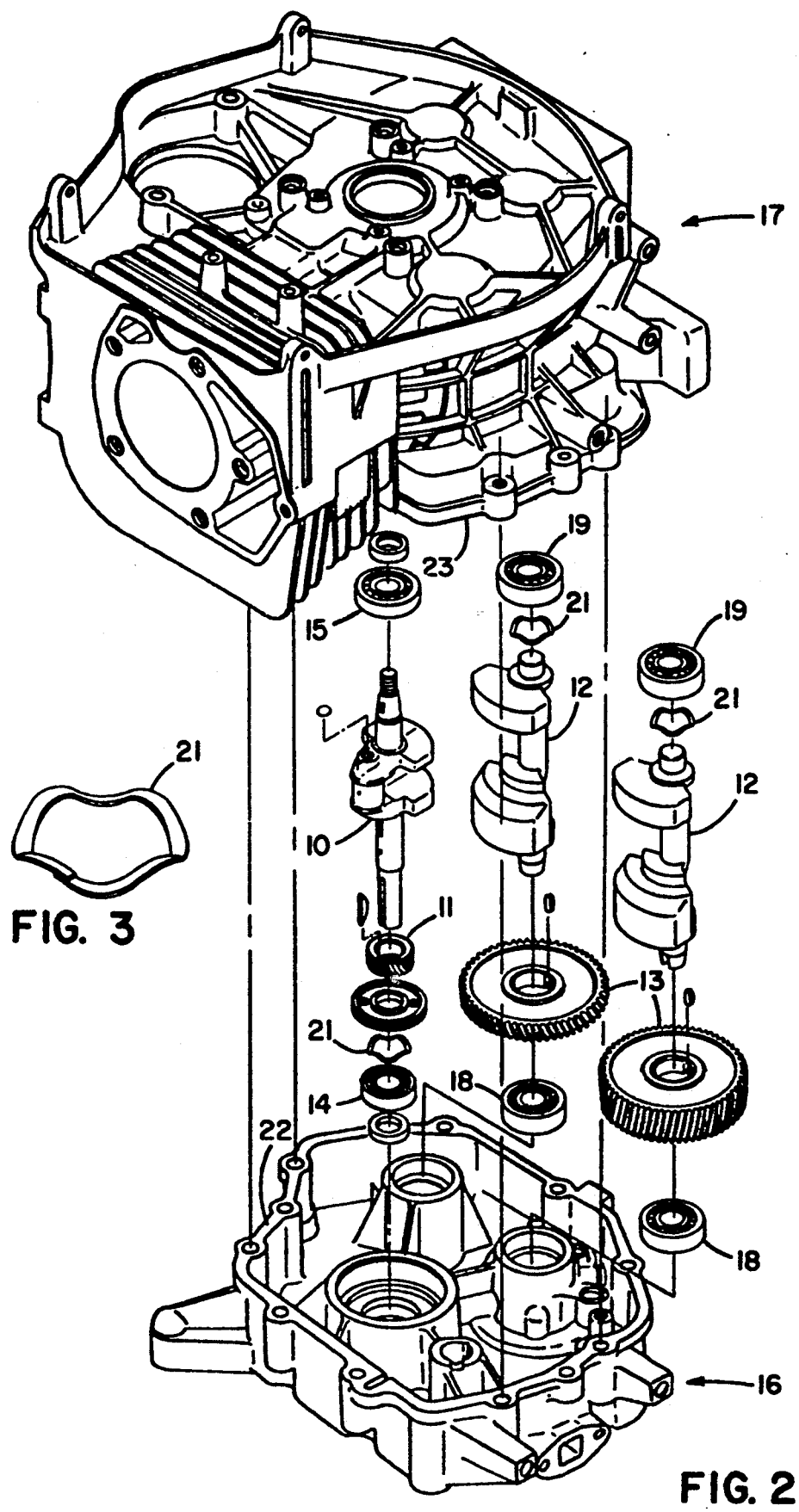

METHOD FOR ASSEMBLING AND PRELOADING SHAFT ASSEMBLIES IN RECIPROCATING INTERNAL COMBUSTION ENGINES

FIELD OF INVENTION

The invention relates to shaft assemblies in reciprocating internal combustion engines and more particularly to shaft assemblies utilizing spring elements that act as spacers and preload the shafts to reduce shaft movement.

BACKGROUND OF INVENTION

Shaft assemblies in reciprocating internal combustion engines are typically comprised of shafts with meshing gears that are supported by bearings placed in the engine oil base and engine cylinder block. Unfortunately, the accumulation of tolerances in the base, the gasket between the block and base, the shafts and the gears can result in a gap between the shaft and the bearings. This gap allows the shaft to move axially during engine operation, causing increased engine wear, engine noise and the possible chucking of the gears.

In addition to the initial gap which may be present, gaps between the shafts and bearings can change during engine operation. Because different materials are used for different components of the assembly, the gaps will change as the temperature in the engine changes because of the different thermal expansion rates of the components. External forces that are exerted on the shaft, for example by the gears, will also affect the size of the gap and these forces can vary with engine speed.

One method that is currently used to eliminate this gap is to place shims between the shaft and bearings with thicknesses equal to the gap. Unfortunately, the use of shims does not eliminate the entire gap, but only reduces the gap. The insertion of shims during assembly is also very time consuming, requiring the assembler to use a special measuring device to measure the exact gap that will result in each shaft/bearing assembly for each engine. The problems with using shims is magnified for field service personnel who do not have the same measuring devices but must select new shims whenever a component is changed. Moreover, the use of shims does not address the movement of the shaft caused by thermal expansion and external forces on the shafts.

A second method that could be used to eliminate the gap would be to use compressible spacers similar to those described in U.S. Pat. Nos. 4,492,018 and 4,611,935. A compressible spacer with a thickness that is greater than the maximum gap that could arise from the accumulated design tolerances would be placed on the shaft. When the engine is assembled, the spacer would be compressed to the proper thickness. Unfortunately, this method does not address the movement of the shaft due to thermal expansion and external forces. Therefore, the shaft could move during engine operation to create a gap or the shaft could move to further compress the spacer which would result in a gap when the shaft moved back during other operating conditions. Moreover, this method can produce undesirable high inward loads on the shaft.

A third method that could be used to eliminate the gaps would be to size each shaft for a specific engine block, engine base and bearing arrangement. Unfortunately, this method does not address the movement of the shaft due to thermal expansion and external forces. Moreover, a new shaft would be needed each time a block, oil base or bearing was changed and a new block or oil base may be needed if a shaft were changed. Therefore, the problems of field service personnel and the cost of repairs would be increased.

Therefore, there arises a need for a method of assembling a shaft assembly in a reciprocating internal combustion engine that eliminates any gaps created due to the accumulation of design tolerances and that reduces the movement of the shaft caused by thermal expansion or external forces.

SUMMARY OF THE INVENTION

The present invention is for a shaft assembly and a method for assembling a shaft assembly in a reciprocal internal combustion engine that eliminates any gaps between the shaft and bearings that can arise because of the accumulation of design tolerances and that preloads the shaft to reduce axial movement of the shaft. The invention comprises the steps of placing a spring element between one end of the shaft and a bearing, whereby the spring element is arranged and configured to fill any gap that arises because of the accumulation of design tolerances and is arranged and configured to provide a positive load on the shaft during engine operation to reduce axial movement of the shaft.

The spring element is sized so that it will be under compression at the maximum gap that can arise from the accumulation of design tolerances and shaft movements during operation. In addition, the spring element is arranged and configured to limit the maximum force that it will exert on the shaft to a level that will not be harmful to the bearings. Therefore, the spring element will always exert a positive load on the shaft thereby reducing shaft movement without harming the bearings.

The time of assembly and problems associated with repairs are also eliminated by the invention. One spring element can be used for a given shaft assembly regardless of the gap that arises due to the accumulation of the design tolerances of each specific engine shaft assembly. Therefore, measuring tools are not necessary during assembly and service personnel can stock a single part that will be appropriate for any engine repair.

BRIEF DESCRIPTION OF THE DRAWINGS

FIG. 2 is an exploded view of the preferred embodiment of the invention;

FIG. 3 is a perspective view of a wave spring for use in the preferred embodiment.

DETAILED DESCRIPTION OF THE PREFERRED EMBODIMENT

Figure 1:
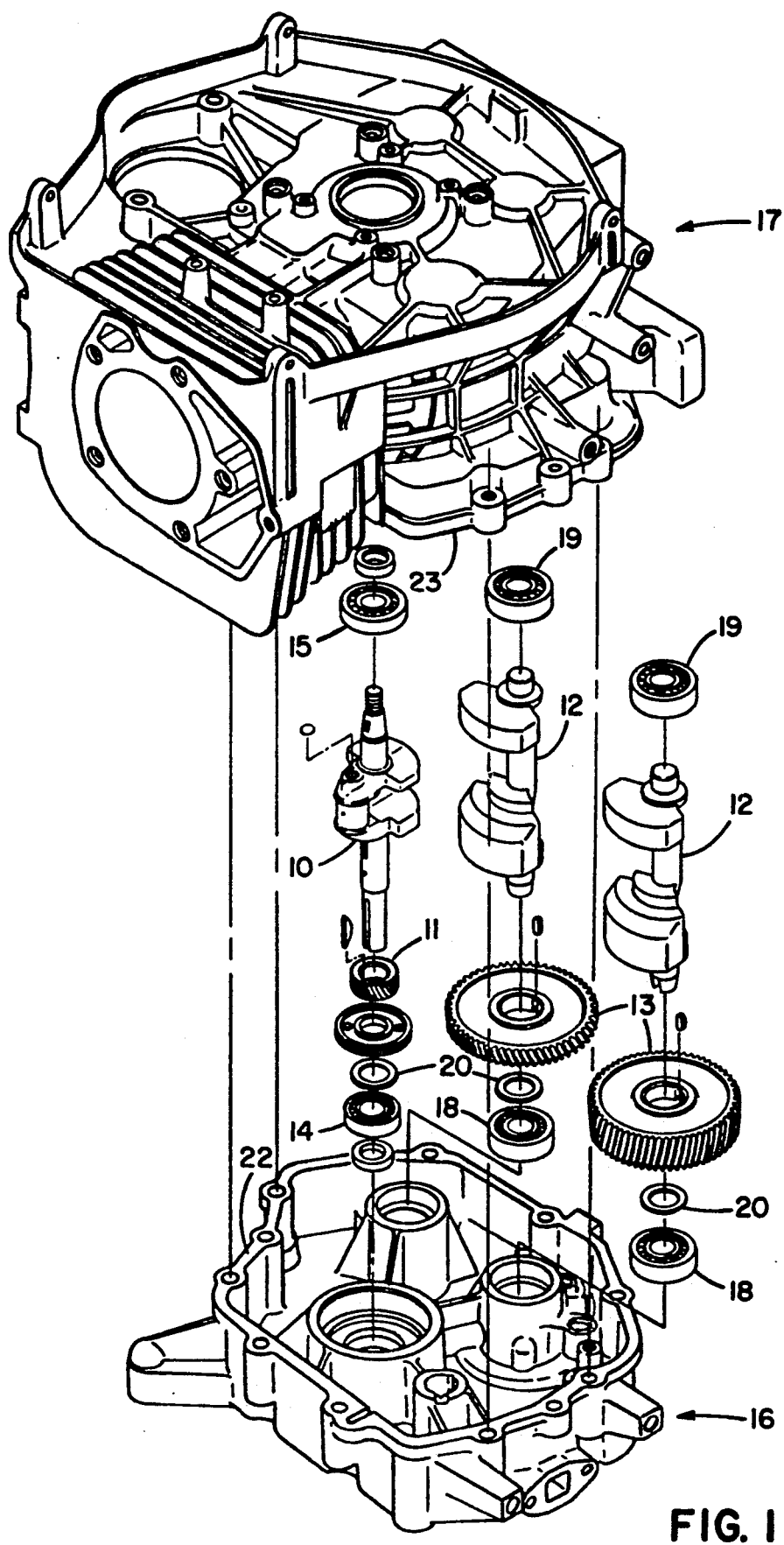
FIG. 1 is an exploded view of a shaft assembly that is currently used in the small engine industry.

Referring to the drawings where like numerals designate like parts, the preferred embodiment of the invention is a shaft assembly generally shown in FIG. 2 for a reciprocating internal combustion engine, more specifically, the Onan E125V engine. The shaft assembly comprises a crankshaft 10 with first and second ends having a crankshaft gear 11 generally located near the first end of the crankshaft 10. The shaft assembly also comprises two balance shafts 12 with first and second ends, each having a balance shaft gear 13 that is arranged and configured to mesh with the crankshaft gear 11. The crankshaft gear 11 and balance shaft gears 13 are of a helical design.

The crankshaft 10 is supported by a first crankshaft bearing 14 which is inserted into the engine oil base 16 and a second crankshaft bearing 15 which is inserted into the engine cylinder block 17. Similarly, the balance shafts 12 are supported by a first balance shaft bearing 18 that is inserted into the oil base 16 and a second balance shaft bearing 19 that is inserted into the engine cylinder block 17.

The current method of assembling a shaft assembly, shown in FIG. 1, begins by placing the first crankshaft bearing 14 and first balance shaft bearings 18 into the oil base 16. The cylinder block 17 is then inverted and the second crankshaft bearing 15 and second balance shaft bearings 19 are placed in the cylinder block 17. The second ends of the crankshaft 10 and balance shafts 12 are then placed into the second crankshaft bearing 15 and second balance shaft bearings 19, respectively.

A special measuring device is then used to measure the relative distance between the cylinder block gasket surface 23 and the first end of the crankshaft 10 as compared to a nominal value. A special measuring device is also used to measure the relative distance between the oil base gasket surface 22 and the inner race of the first crankshaft bearing 14 as compared to a nominal value. These relative distances are used to read a chart to determine the proper shim 20 thickness. The same procedure of measuring and using a chart is then performed for each balance shaft 12.

The preferred method of assembling the shaft assembly is to use a wave spring 21 to fill any gap that might arise. The wave spring 21, best shown in FIG. 3, is generally hoop-shaped with an undulating surface resembling waves. The diameter of the wave spring 21 for use on the crankshaft 10 is sized to be equal to the diameter of the inner race of the first crankshaft bearing 14 to reduce the relative motion between the wave spring 21 and the first crankshaft bearing 14. The diameter of the wave spring 21 for use on the balance shafts 12 is sized to be equal to the diameter of the inner race of the second balance shaft bearing 19 to reduce the relative motion between the wave spring 21 and the second balance shaft bearing 19.

The thickness of the wave spring 21 is sized to provide a minimum of five pounds of load on the crankshaft 10 or balance shaft 12 at the maximum gap that could arise from the accumulation of design tolerances and shaft movements from external forces and thermal expansion. The wave spring 21 is also sized to exert no more than thirty pounds of load on the crankshaft 10 or balance shaft 12 at the minimum gap that could arise from the accumulation of design tolerances and shaft movements from external forces and thermal expansion. Therefore, the continuous positive load exerted by the wave spring 21 acts to resist axial movements of the crankshaft 10 or balance shafts 12 during engine operation but does so at a small enough load to prevent a reduction in bearing life.

Those skilled in the art would recognize that other spring-type elements may be used with the invention, however, a stainless steel wave spring 21 has been chosen because of the operational environment. First, the spring element must operate in temperatures of 250 degrees Fahrenheit or more. Second, a relatively constant spring rate is needed to reduce shaft movement without overloading the bearings. Finally, the thickness of the spring element should be small so that the spring element can replace shims 20 that are used in current designs without major design modifications to the existing shaft assembly.

The preferred method of assembling the preferred embodiment of the invention is to place the first crankshaft bearing 14 and first balance shaft bearings 18 into the oil base 16. A wave spring 21 is then placed on the first end of the crankshaft 10. The first end of the crankshaft 10 is then inserted into the first crankshaft bearing 14 and the first ends of the balance shafts 12 are then inserted into the first balance shaft bearings 18. Wave springs 21 are then placed onto the second ends of the balance shafts 12. The second crankshaft bearing 15 and the second balance shaft bearings 19 are then inserted into the engine cylinder block 17. The engine cylinder block 17 is then placed onto the oil base 16 whereby the second ends of the crankshaft 10 and balance shafts 12 are inserted into the second crankshaft bearing 15 and the second balance shaft bearings 19, respectively. The engine cylinder block 17 is then secured to the oil base 16 completing the assembly.

This method of assembly results in a shaft assembly in which the crankshaft 10 is preloaded in an upward direction and the balance shafts 12 are preloaded in a downward direction. This preloading resists the axial forces caused by the helical gears which tend to force the crankshaft 10 and balance shafts 12 in opposite directions. Therefore, the axial movement of the shafts from gear forces is resisted.

Although characteristics and advantages together with details for structure, materials, function and process steps, have been described in reference to a preferred embodiment herein, it is understood that the disclosure is illustrative. To that degree, various changes made, especially to the matters of shape, size and arrangement, to the full extent extended by the general meaning of the terms in which the appended claims are expressed, are within the principles of the present invention.

What is claimed is:

1. A method for assembling and preloading a shaft with first and second ends for use in a reciprocating internal combustion engine comprising the steps of:
   a. placing a first bearing into an engine oil base that is arranged and configured for receiving said first bearing, said first bearing arranged and configured for receiving said first end of the shaft;
   b. placing a second bearing into an engine cylinder block that is arranged and configured for receiving said second bearing, said second bearing arranged and configured for receiving said second end of the shaft;
   c. placing a spring element on either said first or second end of the shaft, said spring element arranged and configured to fill any gap between the shaft and said first and second bearings arising due to the accumulation of design tolerances and arranged and configured to continually provide a positive load on the shaft during engine operation to reduce axial movement of the shaft;
   d. placing said first end of the shaft into said first bearing;
   e. placing said cylinder block onto said oil base whereby said second end of the shaft is inserted into said second bearing; and
   f. securing said cylinder block to said base.

2. A method for assembling and preloading a shaft as in claim 1 wherein said spring element is a wave spring.

3. A method for assembling and preloading a shaft as in claim 2 wherein said wave spring is arranged and configured to apply a minimum load of five pounds of force to the shaft at the maximum gap that will occur between the shaft and said bearing and a maximum load of 30 pounds of force on the shaft at the minimum gap that will occur between the shaft and said bearing.

4. A method for improving the assembly of shafts that are supported by at least one bearing in reciprocal internal combustion engines and for reducing the axial movement of said shafts comprising the steps of:
  a. placing a spring element on one end of the shaft, said spring element arranged and configured to fill any gap between the shaft and the bearings that arises because of the accumulation of design tolerances and arranged and configured to continually provide a positive load on the shaft during engine operation to reduce the axial movement of the shaft; and
  b. securing the shaft between the bearings.

5. A method for improving the assembly of shafts that are supported by at least one bearing as in claim 4 wherein said spring element is a wave spring.

6. A shaft assembly for a reciprocating internal combustion engine comprising:
  a. at least one shaft with first and second ends;
  b. an oil base arranged and configured for receiving at least one bearing;
  c. at least one first bearing placed into said oil base that are arranged and configured to allow the insertion of said shaft first ends;
  d. a cylinder block arranged and configured for receiving one or more bearings;
  e. at least one second bearing placed into said cylinder block that are arranged and configured to allow the insertion of said shaft second ends when said cylinder block is secured to said base;
  f. a wave spring generally located between either said first bearing and said shaft or between said second bearing and said shaft that is arranged and configured to fill any gap between said shaft and said first and second bearings that arises from the accumulation of design tolerances and that is arranged and configured to continually provide a positive load on said shaft during engine operation to reduce axial movement of said shaft.

* * * * *

UNITED STATES PATENT AND TRADEMARK OFFICE
CERTIFICATE OF CORRECTION

PATENT NO. :     5,193,501
DATED      :     March 16, 1993
INVENTOR(S) :    Klejeski et al.

It is certified that error appears in the above-identified patent and that said Letters Patent is hereby corrected as shown below:

Column 5, line 14, delete "bearings" and insert
--bearing--.

Column 5, line 20, delete "bearings" and insert
--bearing--.

Column 6, lines 7-8; delete "that are arranged and configured to allow the insertion of said shaft first ends" and insert --said first bearing being arranged and configured to allow the insertion of said shaft first end;--

Column 6, line 10; delete "one or more bearings" and insert --at least one bearing--.

Column 6, line 12; delete "that are" and insert --said second bearing being--.

Column 6, line 13; delete "ends" and insert --end--.

Signed and Sealed this

Fifth Day of April, 1994

*Attest:*

BRUCE LEHMAN

*Attesting Officer*     Commissioner of Patents and Trademarks